United States Patent
Carley

(10) Patent No.: US 7,069,177 B2
(45) Date of Patent: Jun. 27, 2006

(54) SYSTEM AND METHOD FOR PROVIDING COMPOSITE VARIANCE ANALYSIS FOR NETWORK OPERATION

(75) Inventor: Stephen Carley, Boulder, CO (US)

(73) Assignee: Savvis Communications p/s Corporation, Town and Country, MO (US)

( * ) Notice: Subject to any disclaimer, the term of this patent is extended or adjusted under 35 U.S.C. 154(b) by 0 days.

(21) Appl. No.: 10/743,732

(22) Filed: Dec. 24, 2003

(65) Prior Publication Data

US 2004/0138858 A1  Jul. 15, 2004

Related U.S. Application Data

(63) Continuation of application No. 09/906,288, filed on Jul. 16, 2001, now Pat. No. 6,708,137.

(51) Int. Cl.
G06F 11/34 (2006.01)
(52) U.S. Cl. .................. 702/179; 702/186; 702/188; 702/182; 702/183; 709/224
(58) Field of Classification Search ................ 702/118, 702/122, 176–181, 182–188; 706/908–416; 709/223–226; 714/47; 370/241, 245, 232
See application file for complete search history.

(56) References Cited

U.S. PATENT DOCUMENTS

| 6,073,089 A | 6/2000 | Baker et al. ................. 702/185 |
| 6,377,907 B1 | 4/2002 | Waclawski .................. 702/182 |
| 6,564,174 B1* | 5/2003 | Ding et al. .................. 702/186 |
| 6,643,613 B1* | 11/2003 | McGee et al. .............. 702/186 |
| 6,701,363 B1* | 3/2004 | Chiu et al. .................. 709/224 |

OTHER PUBLICATIONS

Morris et al., "Variance of aggregated Web traffice", INFOCOM 2000, Nineteenth Annual Joint Conference of the IEEE Computer and Communications Societies, Proceedings, IEEE, vol.: 1, 2000, pp. 360-366 (No month).
Judge, J., "A Model for the Marginal Distribution of Aggregate Per Second HTTP Request Rate", Local and Metropolitan Area Networks, 1999, pp. 29-36 (No month).
Kushida, T., "The Traffic Measurement and the Empirical Studies for the Internet", Global Telecommunications Conference, 1998, IEEE, pp. 1142-1147 (No month).

* cited by examiner

*Primary Examiner*—Hal Wachsman
(74) *Attorney, Agent, or Firm*—Davidson Berquist Jackson & Gowdey, LLP

(57) ABSTRACT

A system for analyzing the performance of a network includes a data collection agent that collects performance data including first and second sets of measurements of a single network parameter. First and second variance statistics are calculated. A user is alerted about potential network performance problems based on whether a predetermined relationship exists between the variance statistics. The user may be notified by sending an e-mail to the user; and/or sending a fax to the user; and/or initiating a phone call to the user. The user may be alerted by a message to a PDA or a cellular telephone.

29 Claims, 5 Drawing Sheets

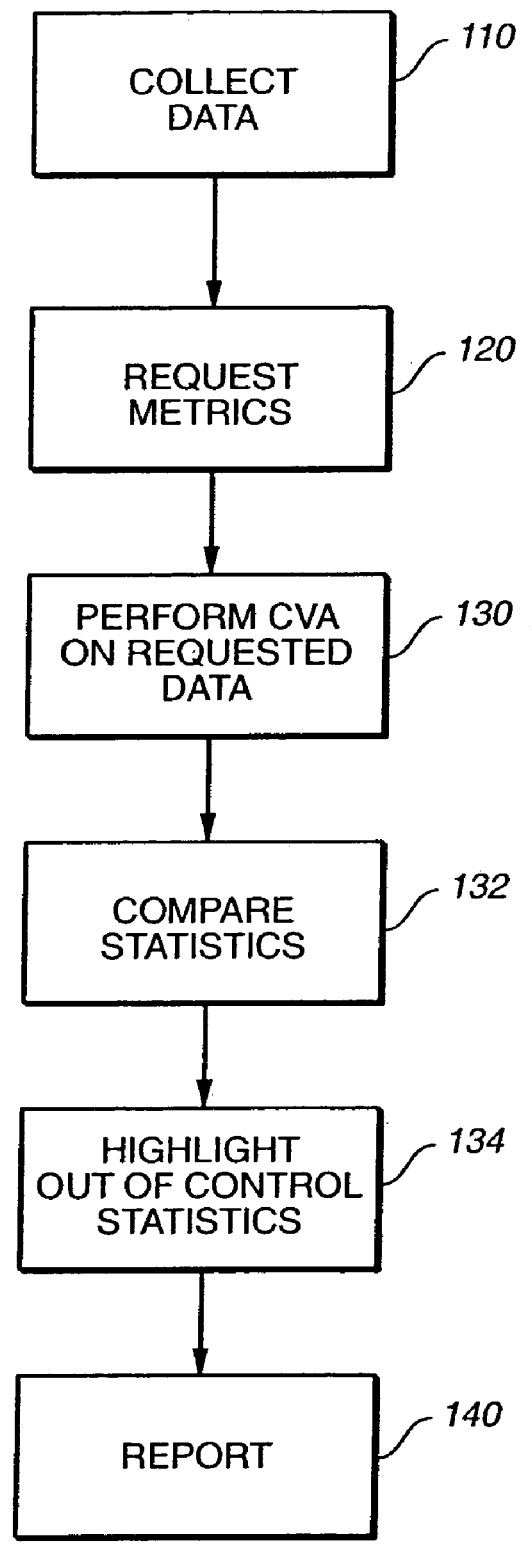
FIG._1

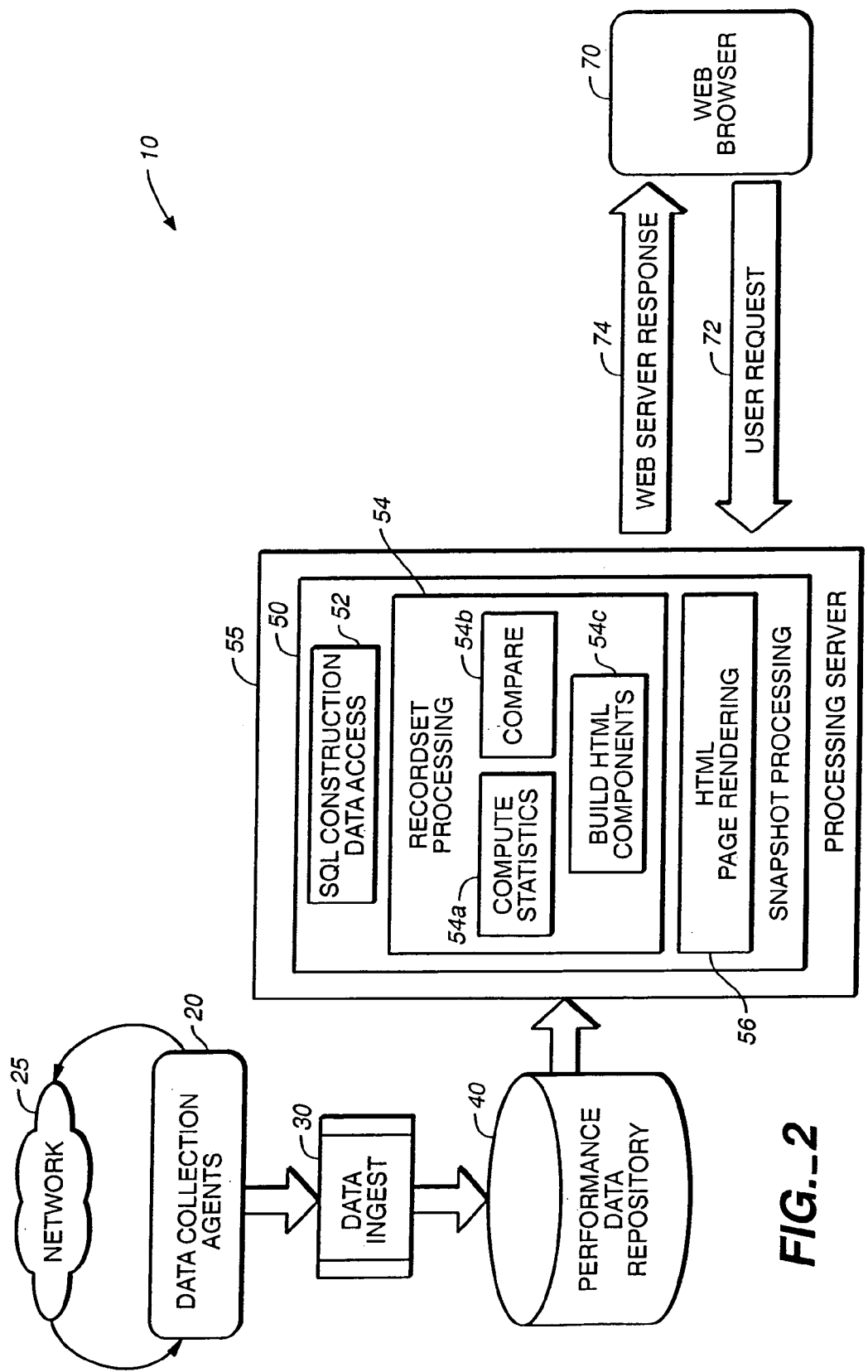
FIG._2

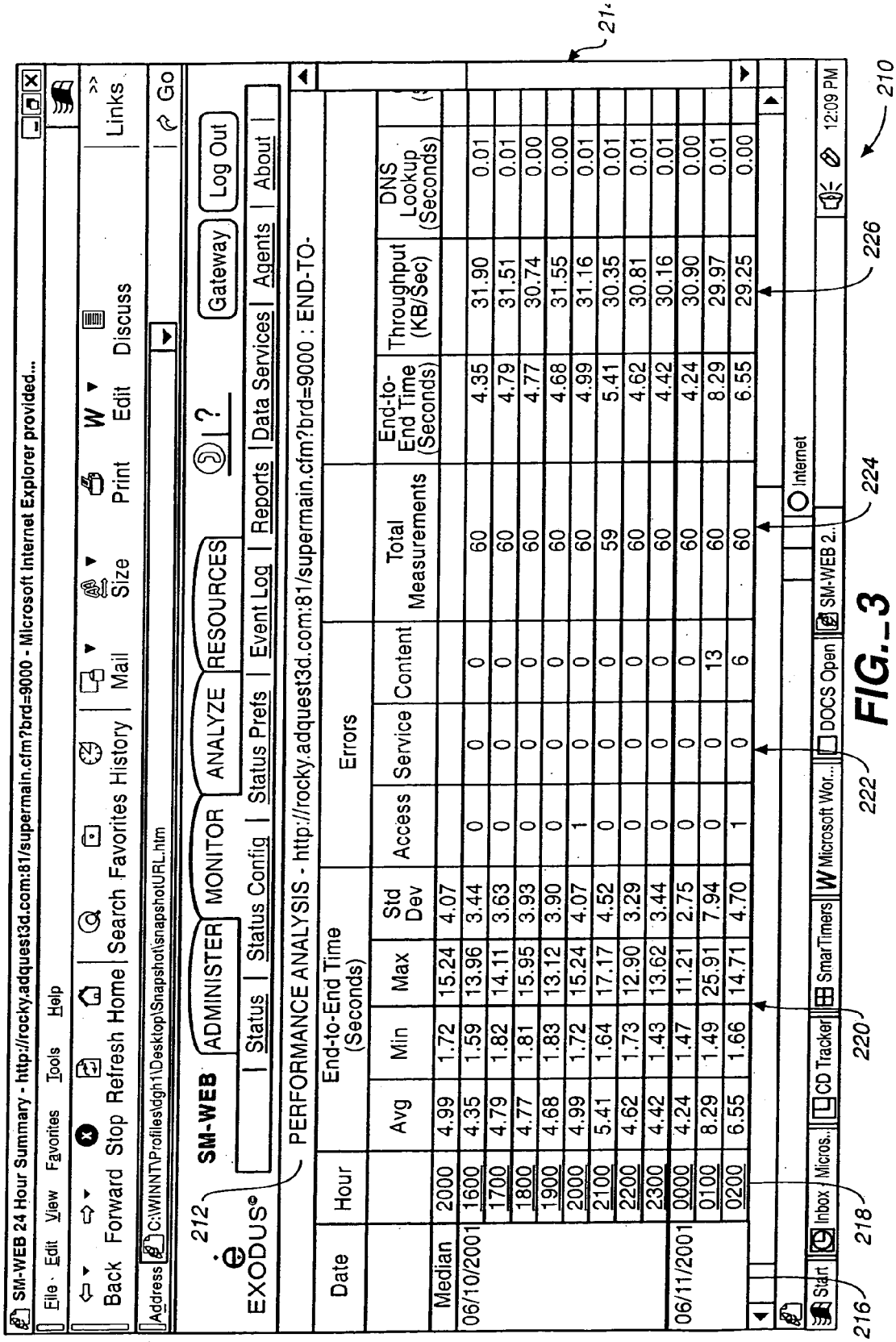
FIG._3

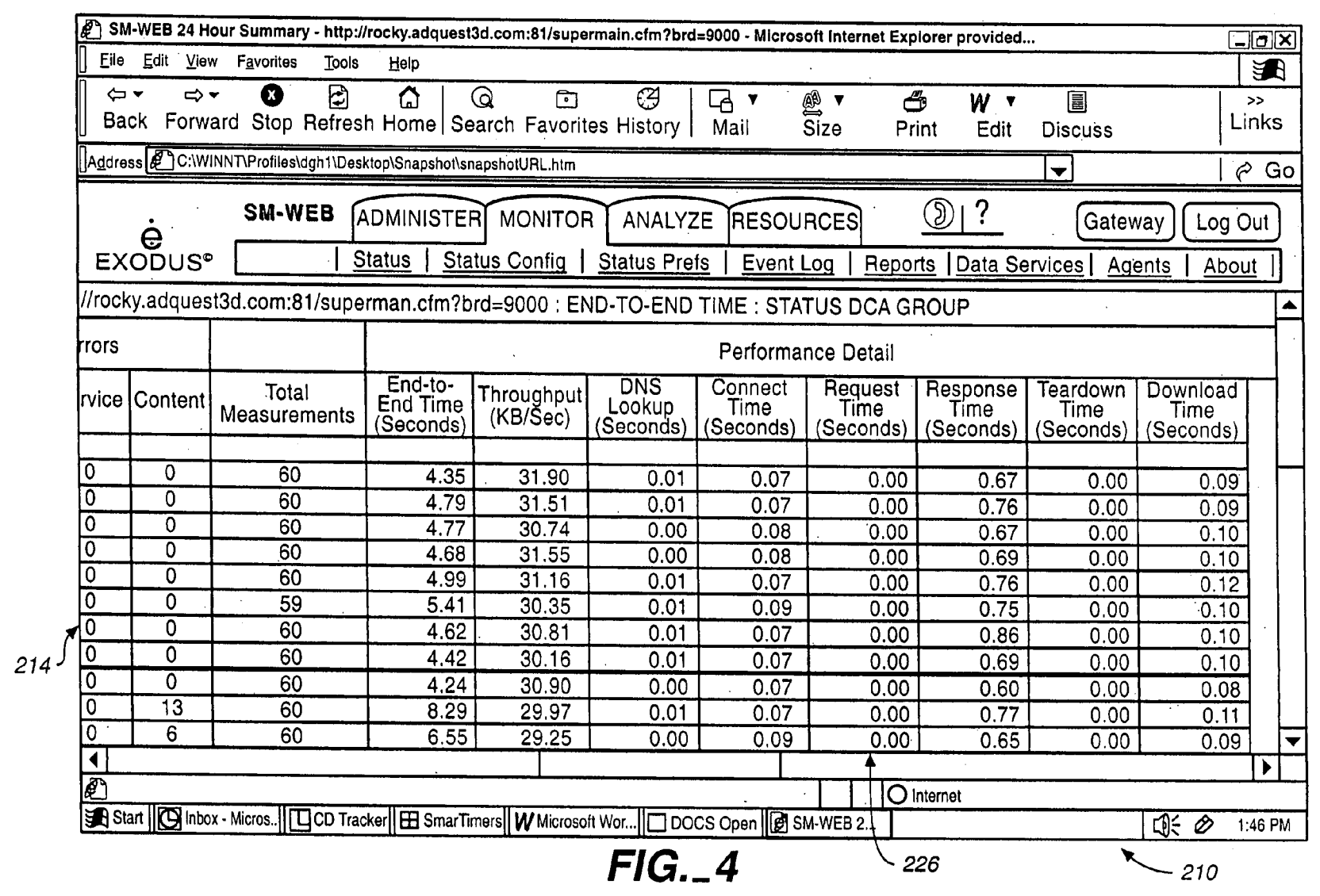

FIG._4

| 06/11/2001 | | Status | | Status Config | | Status Prefs | Event Log | Reports | Data Services | Agents | |
|---|---|---|---|---|---|---|---|---|---|---|---|
| 2300 | 4.42 | 1.43 | 13.62 | 3.44 | 0 | 0 | 0 | 60 | 4.42 | 30.16 | 0.01 |
| 0000 | 4.24 | 1.47 | 11.21 | 2.75 | 0 | 0 | 0 | 60 | 4.24 | 30.90 | 0.00 |
| 0100 | 8.29 | 1.49 | 25.91 | 7.94 | 0 | 1 | 13 | 60 | 8.29 | 29.97 | 0.01 |
| 0200 | 6.55 | 1.66 | 14.71 | 4.70 | 0 | 1 | 6 | 60 | 6.55 | 29.25 | 0.00 |
| 0300 | 5.10 | 1.48 | 11.45 | 3.46 | 0 | 0 | 3 | 60 | 5.10 | 28.99 | 0.01 |
| 0400 | 4.49 | 1.62 | 18.34 | 4.43 | 0 | 0 | 0 | 60 | 4.49 | 30.97 | 0.01 |
| 0500 | 4.67 | 1.65 | 14.40 | 3.60 | 0 | 1 | 0 | 60 | 4.67 | 33.42 | 0.01 |
| 0600 | 4.98 | 1.88 | 14.28 | 3.48 | 0 | 0 | 0 | 60 | 4.98 | 29.39 | 0.00 |
| 0700 | 5.52 | 1.93 | 13.96 | 3.62 | 0 | 0 | 22 | 60 | 5.52 | 29.80 | 0.01 |
| 0800 | 6.57 | 1.76 | 18.15 | 4.88 | 0 | 2 | 0 | 60 | 6.57 | 29.52 | 0.01 |
| 0900 | 5.94 | 2.35 | 16.23 | 4.02 | 0 | 4 | 0 | 60 | 5.94 | 28.98 | 0.01 |
| 1000 | 13.58 | 3.46 | 23.56 | 5.09 | 0 | 1 | 13 | 60 | 13.59 | 26.90 | 0.01 |
| 1100 | 5.79 | 2.08 | 12.48 | 3.21 | 0 | 0 | 1 | 60 | 5.79 | 29.82 | 0.01 |
| 1200 | 5.86 | 2.08 | 13.41 | 3.33 | 0 | 0 | 1 | 60 | 5.86 | 29.33 | 0.00 |
| 1300 | 4.60 | 2.03 | 11.64 | 2.83 | 0 | 0 | 0 | 60 | 4.60 | 29.69 | 0.01 |
| 1400 | 5.94 | 1.89 | 14.56 | 3.42 | 0 | 0 | 0 | 20 | 5.94 | 30.67 | 0.01 |
| 1500 | - | - | - | - | - | - | - | 0 | | | |

□ = Exceeded Warning Control Limit    ■ = Exceeded Control Limit

FIG._5

SYSTEM AND METHOD FOR PROVIDING COMPOSITE VARIANCE ANALYSIS FOR NETWORK OPERATION

RELATED APPLICATIONS

This application claims priority to and is a continuation of U.S. patent application Ser. No. 09/906,288, filed Jul. 16, 2001, now U.S. Pat. No. 6,708,137, issued Mar. 16, 2004, which is incorporated herein in its entirety.

TECHNICAL FIELD

The present invention relates to performance of information networks. In particular the present invention relates to statistical measurements of performance characteristics of an information network.

BACKGROUND

Internet web sites continue to become more sophisticated and offer a wider variety of media for a user to access. With this trend, users have become more demanding of quick, high quality Internet experiences. As such, to be able to keep up with user's demands, it has become increasingly important for the providers of Internet content to be able to monitor and troubleshoot Internet performance issues to both avoid degraded performance and provide improved performance.

Given this, systems have been developed for measuring relevant network parameters to evaluate network performance and help troubleshoot network issues which might degrade network performance. Generally, such systems utilize computer servers deployed on a network of interest to measure network performance parameters. Such computer servers are generally referred to as data collection agents. (DCAs). A DCA generally connects to a device in the network about which a measurement is desired and takes one or more measurements of one or more predetermined metrics. The DCA then typically stores the results of the measurement either locally or in a remote database. The stored measurements can then be called up and reviewed by a user who accesses the agent.

Such systems can typically measure metrics related to either Universal Resource Locator (URL) objects (such as a web page located on a server on the network) or streaming media objects. URL objects and streaming media objects are collectively referred to herein as network services. With respect to URL objects, such metrics can include, but are not limited to:

End-to-End Time (Seconds): The time taken from the moment a user clicks on a link to the instant the page is fully downloaded and displayed. It encompasses the collection of all objects making up a page including, but not limited to, third party content on off-site servers, graphics, frames, and redirections.

Throughput (KB/Sec): The amount of data streamed back to the user and how long it took (in kilobytes per second). The calculation is based on adding all data segments returned (for example, but not limited to, the body of Hyper Text Markup Language (HTML) documents and images) and dividing that by the total time it took to return that part of the data. It is to be understood that browsers and servers are requesting objects in parallel so throughput does not represent the limit of a Web server in returning data.

DNS (Domain Name System) Lookup (Seconds): The time it takes for the browser to turn the text based hostname (e.g., "www.yahoo.com") into an IP address (207.221.189.100).

Connect Time (Seconds): The time it takes to set up a network connection from the end-user's browser to a web site. A web page is transferred over this connection and many are setup for each page.

Request Time (Seconds): The time it takes to send a request from a user's browser to a server. This is a relevant amount of time if you are submitting a large form (e.g., a message on an email service), or uploading a file (e.g., an attachment to a message on a discussion board). It reflects the ability of a server to accept data.

Response Time (Seconds): The time it takes for a server to respond with content to the browser. Preferably, this measurement is taken by waiting until the first byte of content is returned to the browser.

Teardown Time (Seconds): The time it takes for the browser and server to disconnect from each other.

Download Time (Seconds): The time for the page download from the start of the first object to the end of the last object.

The unit in parenthesis following the name of the metric is the unit in which the measurement is generally taken and recorded.

With respect to Streaming media objects, such metrics include, but are not limited to:

DNS Lookup Time (seconds): This metric is generally the same as the DNS lookup time for URL type objects.

Quantity of Data Received (bytes or bits): The absolute amount of data gathered by the DCA if a stream had been rendered.

Packet Loss (number): The number of packets that are not received by the media monitor.

Percent Packet Loss (number): The percentage of total packets that are not received by the media monitor.

Packets Received (number): The total number of packets received by the media monitor.

Packets Late (number): The number of packets received too late to functionally render.

Packets Resend Requested (number): The number of packets that have been requested to be resent. This metric preferably applies to REALMEDIA® streams, i.e., streams according to protocols of Real Networks, Inc.

Packets Recovered (number): The number of packets for which some type of corrective action is taken. "Corrective action" typically means requesting that the missing or broken packets be resent. This metric preferably applies to REALMEDIA® streams, i.e., streams according to protocols of Real Networks, Inc.

Packets Resent (number): (Also known as packets resend received) the number of packets asked for again (the packets resend requested metric) and were received. This metric preferably applies to REALMEDIA® streams, i.e., streams according to protocols of Real Networks, Inc.

Packets Received Normally (number): The number of packets received by the media monitor from the streaming media server without incident.

Current Bandwidth (bytes/second): The rate at which data are received measured over a relatively small time frame.

Clip Bandwidth (bytes/second): The rate at which data are received measured over the length of the entire stream or over a relatively long predetermined timeframe.

Results of the above measurements can be used to help determine whether network services operating up to standard. In the context of the Internet, results of the above URL object measurements can, for instance, indicate whether a web page is downloading consistently, at a high enough speed, or completely. The results of measurements of the above streaming media parameters can help determine the same information with respect to a streaming media object.

However, while important diagnostic information can be collected about the current status of a particular web page or streaming media service by making individual or random measurements of one or more of the above noted network performance metrics, it can be difficult to use this testing method to fully diagnose performance. For example, using such techniques it can be difficult to determine the performance of a network over time or during certain times of the day, days of the week, or parts of the year. Thus, it can be difficult to detect, and predict, cycles in network operation, such as if a network operates more and less rapidly on a periodic basis. Such information could be useful in determining how other network parameters such as network traffic load, which likely varies over a day, week or year period, effects performance of network services.

Without such information, individual measurements may be misleading. For example, an unsatisfactory results of such measurements may be caused by high or low network traffic load, rather than a specific problem with a network device. Also, using the above described standard techniques, it can be difficult to provide any type of predictive event correlation. For example, what, if any is the effect of degradation of DNS lookup time on overall network service performance during specific time periods? Such predictive information can help providers of network services to set appropriate expectations of network performance for customers of such providers. Additionally, such predictive information can facilitate troubleshooting of root causes relating to network, application and third party content (e.g., banner ads on a web site) issues.

Further, in order to determine whether a particular network service is operating appropriately using the above described methods, a user must initiate measurement of one or more network performance metrics, retrieve and then analyze the result. That is, there is no way for a system that does no more than take measurements of network performance metrics to notify a user if a artwork is not operating correctly because there is no baseline or other reference available to the system to make such a determination.

What is needed is a system for measuring network performance metrics which allows a user to take into account network conditions, such a traffic load, when analyzing the measurement. Also, the system should allow a user to be able to make predictions about network performance at a given time. Additionally, such a system should be automated and should be able to analyze and present measurement results in a manner which is meaningful and straightforward to interpret.

SUMMARY OF THE INVENTION

A system and method in accordance with the present invention collects measurements of network performance metrics and automatically calculates and provides composite variance analysis of such metrics. The system and method can then use history of performance data statistics to alert a user about performance of network services that are outside acceptable tolerance or control limits. The technique exposes subtle deviation from accepted measurement tolerance that can, in turn, be categorized in relation to control limits based on defined standard deviation thresholds.

A system in accordance with the present invention includes at least one DCA located on a network, a processing module interconnected with the DCA, and, preferably, a comparison module interconnected with the processing module. The DCA collects at least a first plurality of measurements of a single network parameter and at least a first set of measurements including at least a single measurement of the single network parameter. Each of the first plurality of measurements is taken at a different time. The processing module calculates at least a first variance statistic, such as an average value, and a second variance statistic. The first variance statistic relates to the first plurality of measurements and the second variance statistic relates to the first set of measurements. The comparison module compares the first variance statistic with at least the second variance statistic to determine if a predetermined relationship exists between the first variance statistic and the second variance statistic. For example, the variance statistics could be averages of the group and first set of measurements. The comparison module could determine if the average of the first set of measurements is within a predetermined multiple of standard deviations from the average of the group of measurements. Preferably, the system also includes a screen display for displaying at least the first and second variance statistics and the results of the comparison thereof.

A method in accordance with the present invention includes collecting at a first plurality of measurements of a single network parameter, each measurement taken at a different time. Also, at least a first set of measurements is collected including at least a single measurement of the single network parameter. Then a first variance statistic associated with the first plurality of measurements and at least a second variance statistic associated with the first set of measurements are calculated. The first variance statistic is then compared with at least the second variance statistic to determine if a predetermined relationship exists the two variance statistics.

DESCRIPTION OF THE DRAWINGS

FIG. 1 is a block diagram illustrating a preferred embodiment of a method for providing composite variance analysis for network operations in accordance with the present invention.

FIG. 2 is a block diagram showing a system for providing composite variance analysis for network operations in accordance with the present invention.

FIG. 3 is a reproduction of a preferred embodiment of a screen display rendered by a page rendering module of a system in accordance with the present invention.

FIG. 4 is a reproduction of the screen display reproduced in FIG. 3 showing a different portion of the screen display.

FIG. 5 is a reproduction of the screen display reproduced in FIG. 3 showing a different portion of the screen display.

DETAILED DESCRIPTION

A system and method in accordance with the present invention collects measurements of network performance metrics and automatically calculates and provides composite variance analysis of such metrics. The system and method can then use history of performance data statistics to alert a user about performance of network services that are outside acceptable tolerance or control limits. That is, a system and method in accordance with the present invention collects raw data including a set of periodic measurements of at least a single network performance metric such as, without limitation, end-to-end time or throughput of at least a single network service. Composite variance analysis is then completed on this set of measurements. The results of this analysis are preferably values such as the average, mean, median, minimum, maximum and standard deviation (referred to collectively herein as variance statistics) of the group of periodic measurements of the single metric. The data collection and analysis can be completed with respect to any network performance metric or group of such metrics. Further, a set of periodic measurements for a single metric can be accumulated over any period of time. Accordingly, the results of the composite variance analysis can advantageously be used to determine how the performance of a given network service with respect to any desired performance metric or group of metrics varies over any amount of time. This also allows a user to advantageously determine whether performance of a network service at any particular time is outside of acceptable limits.

FIG. 1 is a block diagram illustrating a method 100 of providing composite variance analysis of network performance. In step 110, network performance data are collected from a network (not shown) and stored. Such data preferably include periodically repeated measurements of one or more network performance metrics including, but not limited to, those enumerated in the Background section with respect to both URL services and streaming media services such as DNS lookup time or packets lost. Preferably, in step 110, method 100 measures and stores at least one network performance metric corresponding to a URL object or streaming media object on a continuous basis. With respect to URL objects, such metric can include, but is not limited to: throughput, DNS lookup time, connect time, request time, server response time, teardown time, download time, and/or end-to-end time. With respect to streaming media objects, such a metric can include, but is not limited to: packets lost, packets received, bytes received, jitter, percent packets lost, DNS lookup time, buffer time average bandwidth, and/or first stat time. Preferably each of the above listed metrics is collected and stored in step 110 on a continuous basis. It is also considered to collect each metric, or a subset of the metrics, at only predetermined times.

Additionally, in step 110, method 100 preferably takes a measurement of each of the above listed metrics approximately once per minute to take a total of approximately 60 measurements per hour of each metric on a continuous basis. However, it is within the ambit of the present invention to collect measurements of the metrics at any other interval of time. As discussed in detail below, this information can be stored in a database or other type of data storage configuration.

Preferably, in step 110, method 100 collects error data relating to measurements made of network services. More preferably, step 110 collects errors referred to as access errors, service errors and content errors. An access error includes an error that prevents a DCA from starting the download process for a given URL. A service error includes a DCA's failure to load the first object on the URL's page. Service errors can occur, for example, when the configuration for a monitored URL is an improperly formatted or when the site is being worked on. A content error includes an error that is encountered when downloading a component object for a URL.

In step 120, a user requests a report of collected network performance data and a composite variance analysis of such data. In making such a request, the user preferably includes information identifying the URL of the site or the streaming media service to be measured and a time range over which measurements are desired, preferably in the form of a date range or single date with a time range.

After retrieving the raw network performance data corresponding to the URL and time range of the user request, in step 130, the retrieved raw network performance data are analyzed to generate variance statistics. Preferably, the variance statistics include average value, mean value, median value, standard deviations, minimums and maximums of each requested network performance metric over the requested time period. For example, if a user requests throughput, DNS lookup time, connect time, request time and response time for a specific URL over a given 48 hour period, the average value, mean value, median value, minimum value, maximum value and standard deviation for all the measurements taken of each of these metrics over the 48 hour time period is calculated. Thus, if 60 measurements of each metric are taken per hour, for each metric, the variance statistics average, minimum, maximum and standard deviation of 2880 measurements is calculated. In addition to these overall variance statistics, preferably, variance statistics for each of the requested metrics is also calculated for smaller increments of time. Preferably, but not necessarily, a single variance statistic, the average, is calculated for this smaller increment of time. For example, and without limitation, the average value of each requested metric over a 1 hour period is preferably also calculated.

Providing to a user the mean, median, average, minimum, maximum and standard deviation of each metric in the manner described above can advantageously allow the user to determine network performance over a period of time and determine whether a network service device is operating outside of tolerance at any given time during the relevant time period. Additionally, calculating and storing variance statistics for a given metric over predetermined time periods provides a baseline for performance of a network service over time. As such, a user can compare performance of the network service at any given time to the established baseline. As discussed in greater detail below, this can advantageously allow a user to "filter out" systemic network problems, such as network traffic load, which might effect the performance of a network service at a particular time, in evaluating the performance of a network service.

As noted above a system and method in accordance with the present invention preferably identifies for a user network performance parameters that are outside of acceptable control limits. Accordingly, in one embodiment of the present invention, in step 132, averages of subsets of measurements are compared to a calculated standard deviation for the metric as calculated from a larger group of measurements taken over a longer time period. For example, and without limitation, if a user requests measurements of a particular metric over a 48 hour period, and each requested metric is measured approximately once per minute, the subsets of hourly averages (or other variance statistic), preferably calculated from 60 measurements during the 48 hour period can be compared to the same variance statistic calculated for the entire group of 2880 measurements taken over the 48 hour period. Preferably, regardless of whether a user requests data for a 48 period or other length of time, the hourly average of each metric is compared to the average value of the same metric over the entire requested time period, or, as explained below, over another time period. It should be noted that herein, a subset of measurements can include a single measurement. In such a case, the average for the subset exists and is considered to be the value of the single measurement.

The comparison that is made in step 132 preferably, though not necessarily, involves determining if the average (or other variance statistic) of a subset of measurements is within a predetermined number of standard deviations from the average (or other variance statistic) of an overall group of measurements from which the standard deviation was calculated. The subset or subsets of measurements can be part of the overall group of measurements but need not be. If the variance statistic of a subset of measurements is more than a predetermined number of standard deviations away from the same variance statistic of an overall group of measurement, then the variance statistic of the subset of measurements is considered to be outside of acceptable tolerance or, in other words, "out of control". What constitutes out of control performance, that is, how many standard deviations a variance statistic of a subset of measurements must be away from the same variance statistic of a larger group of measurements, is preferably configurable by a user.

Chart 1 below provides an example of the results of a potential measurement of end-to-end time (the time taken from the moment a user clicks on a link to a web page to the instant the web page is fully downloaded and displayed) illustrating in control and potentially out of control performance. In this example, it can be assumed that the total measurement time is over a 48 hour period and that end-to-end time pertaining to the relevant web site is being measured approximately once per minute. In Chart 1, the variance statistic that is calculated and compared is average value of the end-to-end time. It could, however, be a mean, median, maximum, minimum or other such statistic of the end-to-end time.

Chart 1

End-To-End Time

| | Hourly Average (Sec.) | # Std. Dev. from Collective Avg. |
|---|---|---|
| Hour 1 | 4.5 | <1 |
| Hour 2 | 8.0 | >1 but <2 |
| Hour 3 | 12.5 | >2 |
| Hour 4 | 4.2 | <1 |
| Collective Average | 4.0 | |
| Standard Deviation | 2.0 | |

The first four rows of the first column of chart 1 list the average of the 60 measurements taken during the first four hours of the 48 hour time period. The fifth row of the first column lists the collective average of the 2880 measurements taken of end-to-end time over the 48 hour period and the sixth row of the first column lists the standard deviation of this collective set of measurements. The second column of chart 1 displays the number of standard deviations each hourly average is away from the collective average. As shown, in hour 1, the average end-to-end time was 4.5 seconds which is less that 1 standard deviation away from the collective average. Accordingly, the end-to-end time in hour one would likely be considered within acceptable operating tolerance or in control. However, in hour 2 the hourly average was 8.0 seconds. This is more that 1 standard deviation away from the collective average but still less that 2 standard deviations away from the collective average. Accordingly, the end-to-end time in hour 2 might be considered out of control. In hour 3, the hourly average is 12.5 seconds. This is greater than 2 standard deviations away from the collective average and accordingly, would likely be considered out of control. In hour 4, the hourly average is back within control at 4.2 seconds, which is less than one standard deviation away from the collective average.

Whether a metric is in or out of control is preferably determinable by the user. For example, the user may determine that anything within 2 standard deviations of a collective variance statistic is in control or that anything greater than 1 standard deviation from the collective variance statistic is out of control. Any other scheme for determining what performance is in control and what performance is out of control is also within the ambit of the present invention. For example, and without limitation, the determination of whether a network parameter is out of control or not could also be made using any other number of standard deviations or fractions of standard deviations. That is, if the measurement is greater than 1.5 standard deviations away from the collective average or greater than 2.5 standard deviations away from the collective average, the parameter could be considered out of control.

It is also contemplated to categorize performance in two or more levels. For example, without limitation, any measurement greater than 1 standard deviation from the collective average but less that 2 standard deviations therefrom could be considered a first, or warning level. And, any measurement greater than 2 standard deviations away from a collective average would be considered a second, or alert level. Each level could, for example, indicate that certain corrective or additional actions should be taken.

If an variance statistic of a subset of measurements is out of control, a problem could be indicated with a web site, server, streaming media service, or other component of the network and is preferably reported out to a user. Accordingly, in step 134, variance statistics which are out of control are highlighted to stand out from other calculated and reported variance statistics for the user that requested the set of measurements in step 120. How the measurements are highlighted depends upon how the information is to be reported to the user. Preferably, as explained in detail below, the requested measurements and statistics are reported to the user in a tabular or chart format in a screen display provided on a user terminal. Using this reporting format, measurements that are out of control are preferably highlighted by displaying such measurement in a different color than measurements that are in control. Most preferably, variance statistics that are within 1 to 2 standard deviations away from a collective variance statistic are highlighted in a first color and variance statistics that are greater than 2 standard deviations from a collective variance statistics are highlighted in a second color. In step 140, the results of the request made in step 120 are reported back to the user making the request. As discussed above, this is preferably done by providing a screen display showing the measurement and variance analysis results in tabular or chart form on a monitor of a user terminal. It is also considered, however, that the measurement and variance analysis results be displayed in any other format such a graph showing averages (or other variance statistic) over time as compared to standard deviations. It is also within the ambit of the present invention that the reporting out step includes generating an alarm when one or more metrics for one or more network services are out of control. To initiate such an alarm, the method and system of the present invention could send and e-mail to a predetermined address, send a fax, or initiate a phone call.

As discussed above with respect to step 132, in one embodiment of method 100 it is preferable to compare hourly averages of measured network performance metrics with collective averages of such metrics over a longer period of time, such as 48 hours, which includes the hour from which the hourly average was calculated. However, past network performance can vary depending on time of day, day or week or even time of year. Specifically, for example, due to different amounts of network traffic in the middle of a week day afternoon as compared to early morning weekend times, a network service will likely display superior performance during the early morning weekend times. For example, due to varying network traffic, an average end-to-end time would likely be longer in the middle of a Friday afternoon than early Saturday morning.

Accordingly, limits of acceptable network performance would likely be different for the two time periods. Specifically, variance statistics of network performance metrics for the high network traffic periods would reflect the fact that the network is under heavy load. For example, DNS lookup times, connect times, request times, packets lost and packets received may all be longer during a period of high network traffic than during a period of low network traffic. And, such longer time periods might not represent any type of network service malfunction, only that network traffic is high. Thus, applying the limits determined for a consistently low network traffic period to a period of consistently high network traffic period, or vice-versa, could produce misleading results. For example, if DNS lookup time is lower during periods of low network traffic, then a collective average applied to DNS lookup time during periods of high network traffic might be too low and result in false reports of out of control measurements. Conversely, including measurements for periods of high network traffic in the collective average applied to periods of low network traffic could result in missing measurements which might otherwise be considered out of control. Additionally, including periods of relatively high network traffic with periods of relatively low network traffic could result in larger standard deviations. This could cause variance statistics which might otherwise be considered out of control not to be designated as such.

Accordingly, in step 132, it is also within the ambit of the present invention to compare performance at any particular time of interest to past performance at a similar time. For example, network performance on, say, a Wednesday from 2:00 to 4:00 can be compared to network performance on any number of previous Wednesdays over the same time period as opposed to including other times and days of the week in the comparison, such as a Sunday evening at 11:00 p.m. when network traffic would likely be quite different. Preferably, if such a comparison is desired, it can be requested by a user in step 120. In this way, past data from a time frame similar to the time frame of interest can be used to perform the composite variance analysis in step 130.

Determining network performance by comparing network performance data with data collected at similar times can take into account systemic or environmental network conditions such as network traffic. Such a comparison allows systemic or environmental network conditions to be "filtered out" so that operation of a network device or service can advantageously be isolated and accurately measured.

FIG. 2 is a block diagram showing a preferred embodiment of a system 10 for measuring and reporting performance statistics for network operations in accordance with the present invention. As shown, system 10 includes at least one data collection agent (DCA) 20 which is preferably located on a distributed computer network 25 such as the Internet. Network 25 could also include, but is not limited to, a LAN (local area network), WAN (wide area network), MAN (metropolitan area network), VAN (value-added network), PAN (personal area network), PON (passive optical network), VPN, enterprise-wide network, direct connection, active network, control network, an intranet, or any other suitable network. DCA 20 is preferably an automated server that carries out measurements on network 25, pre-determined portions of or services provided on network 25, or a device which is part of network 25. Services provided by network 25 can include, but are not limited to, URL objects such as web sites and streaming media objects.

The type of measurement carried out by DCA 20 depends upon the data to be collected. For example, if DCA 20 is to collect data for a throughput measurement of a given web site, DCA 20 will connect to the given web site and measure the throughput for a predetermined amount of time. Preferably, as discussed above, this measurement will be repeated on a periodic basis for a given duration of time. Measurement of URL object and streaming media object parameters, such as those listed in the Background section, by DCA's is well understood by those skilled in the art.

Preferably, DCA 20 is pre-configured with information concerning what measurements are to be taken, at what times and on which network services. Such pre-configuration of a DCA is well understood by those skilled in the art. For web page or steaming media measurements, the configuration preferably contains the URL or location of the streaming media object for which a given test is to be performed. The configuration also contains the network performance metric to be tested and the frequency of the test to be performed (for example, once each minute, preferably at substantially evenly spaced intervals).

Preferably, DCA 20 is configured to take measurements of at least each of the following URL or streaming media service metrics once each minute on a continuous basis: throughput, DNS lookup time, connect time, request time, server response time, connection time, socket teardown time download time, and/or end to end time. With respect to streaming media services, such a metrics can include, but are not limited to: packets lost, packets received, bytes received, jitter, percent packets lost, DNS lookup time, buffer time average bandwidth, and/or first stat time. However, which metrics are measured and when they are measured can be determined in advance by a user.

DCA 20 then performs the requested tests to collect performance data for one or more URLs or service metrics named in the subscription. DCA 20 can be a Windows NT servers, UNIX servers or any other type of server. Configuration and implementation of a DCA such as DCA 20 is well understood by those skilled in the art.

After data are collected by DCA 20, the data are forwarded to data ingest module 30 which transforms the data into an appropriate format for storage as is well understood by those skilled in the art. Preferably, DCA 20 forwards data to data ingest module 30 on a regular, predetermined basis. Information concerning when this data are to be forwarded is preferably included in the DCA configuration information. Data ingest module 30 then forwards the data to performance data repository 40 which is preferably, but not necessarily, placed at a network location apart from DCA 20. Performance data repository 40 can be any type of database or a plurality of databases capable of storing network performance metric data collected by DCA 20. It is also considered, however, that performance data repository could be any facility for storing text strings. Preferably, however, performance data repository 40 supports Structured Query Language (SQL).

System 10 also includes processing software 50 which performs statistical analyses on network performance metric data collected by DCA 20 and stored in performance data repository 40. Processing software 50 preferably runs on a processing server 55 and will be discussed in greater detail below. System 10 also includes web browser 70 which provides a user (not shown) with access to processing server 55 and processing software 50. Data collected by DCA 20 remains in database 40 until a user request 72 is initiated by the user of web browser 70. Web browser 70 is preferably a standard computer terminal including a display monitor but can be any device, such as a PDA or cellular telephone, capable of communicating with processing server 55.

User request 72 preferably includes identifying information for the URL or streaming media service, network device, or other portion of network 25 which the user wishes to analyze. User request 72 also preferably includes a time and/or date range over which the user wishes to retrieve data. Additionally, as discussed above, if the user wishes to compare data from the requested time and date range to a similar, but different, time and date range, user request 72 will also include the similar time and date range to which the requested time and date range is to be compared. User request 72 is received by data access module 52. Preferably, data access module 52 constructs a query for data repository 40 to retrieve the raw data from data repository 40 necessary to generate the requested composite variable statistics.

As discussed above, DCA 20 preferably measures a wide range of metrics of pre-determined network services on a continuous basis. And, most preferably, such measurements are taken approximately once each minute. Also as discussed above, all these measurements are stored in data repository 40. Further, data repository 40 preferably retains all the data provided to it by data ingest module 30 for a predetermined period, such as 3 months. As such, a request for data constructed by data access module 50 can preferably retrieve data from any time frame within the predetermined data retention time period for any metric measured for a monitored network device or service. Also, because data repository 40 preferably stores each measurement made and measurements are preferably made in approximately one minute increments, data are preferably retrieved in one minute increments. Construction of a query to retrieve data from a data repository such as data repository is well understood by those skilled in the art.

After retrieving the required raw data from data repository 40, data access module forwards the raw data to recordset processing module 54. Recordset processing module 54 preferably completes requested composite variance analysis on raw measurement data collected by DCA 20. Additionally, recordset processing module 54 preferably constructs components of a display of the calculated statistics. The display is to be used to present the calculated statistics to the network analyst on web browser 70. Preferably, recordset processing module 54 constructs components of a display using a computer markup language such as HTML.

Recordset processing module 54 includes compute statistics module 54a, compare module 54b and build components module 54c. Compute statistics module 54a of recordset processing module 54 preferably completes the composite variance analysis of the raw data provided by data access module 52. Compute statistics module 54a accepts data sets for each metric included in the query results and calculates statistics over pre-determined time periods for each of the data sets. Preferably, compute statistics module 54a can be configured to calculate any statistics for a data set over any time range. More preferably, however, compute statistics module 54a calculates the following statistics over the associated time periods: mean value, median value, average value, standard deviation, minimum value and maximum value for the data set associated with each metric for the entire time period requested (e.g., 48 hours); and hourly averages for the data set associated with each metric. Calculation of such statistics from sets of data is well understood by those skilled in the art.

After computing the requested statistics from the provided raw data, compute statistics module 54a preferably provides the calculated statistics to compare module 54b. In an embodiment of the present invention in which a system and method identifies for a user network performance parameters that are outside of acceptable control limits, compare module 54b compares given variance statistics calculated by compute statistics module 54a to determine if a predetermined relationship exists between the given variance statistics. Preferably, though not necessarily, compare module 54b compares averages, means, medians, minimums and/or maximums of subsets of measurements to an average, mean, median, minimum and/or maximum value calculated from a larger group of measurements taken over a longer time period. Preferably, compute statistics module 54a determines if the variance statistic associated with the subset of measurements (e.g., average, mean, median, minimum and/or maximum) satisfies a predetermined relationship with the corresponding variance statistic associated with the larger group of measurements. If a predetermined relationship does (or, alternatively, does not) exist between compared variance statistics, compare module 54b identifies the variance statistic associated with the subset of measurements for which the predetermined relationship did (or did not) exist.

For example, and without limitation, if a user requests measurements of a particular metric over a 48 hour period, and each requested metric is measured approximately once per minute, the subsets of hourly averages (including 60 measurements) during the 48 hour period can be compared to the standard deviation calculated for the entire group of 2880 measurements taken over the 48 hour period. Preferably, regardless of whether a user requests data for a 48 hour period or other length of time, the hourly average of each metric is compared to the average value of the same metric over the entire requested time period, or, as explained below, over another time period. As noted above, a subset of measurements can include a single measurement. In such a case, the average for the subset exists and is considered to be the value of the single measurement.

More preferably, though not necessarily, compare module 54b determines if the average of a subset of measurements is within a predetermined number of standard deviations from the average of an overall group of measurements from which the standard deviation was calculated. The subset or subsets of measurements can be part of the overall group of measurements but need not be. If the average of a subset of measurements is more than a predetermined number of standard deviations away from the average of an overall group of measurements, then the average of the subset of measurements is considered to be "out of control". Compare module 54b can then flag or otherwise identify averages of the subset of measurements that are out of control. What constitutes out of control performance, that is, how many standard deviations an average of a subset of measurements must be away from the average of a larger group of measurements, is preferably configurable by a user. Performing the above described comparisons between calculated variance statistics, and identifying variance statistics which do not meet certain conditions, is well understood by those skilled in the art.

Preferably, after performing the above described comparisons and identifying measurements that are out of control, compare module 54b forwards this information to build components module 54c. Build components module 54c preferably constructs components of a display of the calculated variance statistics. Preferably, build components module 54c accomplishes this using a computer markup language such at hypertext markup language (HTML). After building components of the measurement and statistics display, build components module 54c preferably forwards the components to page rendering module 56 which interprets the output of build components module 54c and preferably displays the measurements and statistics display on web browser 70. As noted above, build components module 54b preferably constructs an HTML document. Accordingly, page rendering module 56 preferably renders the measurement and statistics display using HTML.

FIG. 3 is a screen print showing a preferred embodiment of a measurements and statistics screen display 210 rendered by page rendering module 56 in accordance with the present invention. Performance analysis line 212 of screen display 210 provides identification information for the service or network component for which calculated statistic are displayed. Specifically, in FIG. 3, the displayed statistics relate to a web site having the URL:

"http://rocky.adquest3d.com:81/supermain.cfm?brd=9000".

Beneath performance analysis line 212, display chart 214 displays measurement and statistics relevant to the displayed URL. Date column 216 displays the date on which corresponding measurements were made. Hour column 218 displays the time over which the corresponding averages were made. In the example shown by display chart 214 of FIG. 3, the time period over which the corresponding averages were calculated is one hour. However, it is considered that hour column 218 could also display any other time period over which displayed measurements were made or displayed averages or other statistic were calculated.

Statistics column 220 displays statistics calculated from the measurements taken by DCA 20 relevant to a user selected metric. The selected metric is displayed at the top of statistics column 220. In the example shown in FIG. 3, the selected metric is end-to-end time. However, any measured metric can preferably be selected. Beneath the column label is displayed the statistics which have been calculated for the relevant metric. In FIG. 3, statistics column 220 is preferably divided into an additional 4 columns displaying for each hour measurements were taken, an average value, minimum value, maximum value and standard deviation.

As discussed above, in a preferred embodiment, each measurement of each metric is taken approximately once each minute. Accordingly, the averages, minimums, maximums and standard deviations displayed in statistics column 220 represent statistics calculated from approximately 60 measurements. The hour and date associated with each statistic displayed is preferably provided in the same row as the statistic. Thus, for example screen display 210 shown in FIG. 3, the average end-to-end time for the web site listed on Jun. 10, 2001 at 1600 hours was 4.35 seconds. The minimum end-to-end time in that hour was 1.59 seconds, the maximum was 15.24 seconds and the standard deviation for the measurements taken over the hour was 3.44. It is also considered to display additional or fewer statistics in statistics column 220.

Display chart 214 also preferably includes errors column 222 which displays the number of errors DCA 20 experienced while taking measurements in the corresponding date and hour. As discussed above, DCA 20 preferably records three types of errors: access errors, service errors and content errors. Errors column 222 is preferably divided into three additional columns to display each of these types of errors for the corresponding date and hour in which the errors occurred. For example, there were 13 content errors with respect to the relevant web site during the first hour of Jun. 11, 2001.

Display chart 214 also preferably includes total measurements column 224 which displays the total number of measurements taken in a corresponding time period (shown in hour column 218). For example, while 60 measurements were taken during most hours on Jun. 10, 2001, at 2100 hours on that day, only 59 measurements were taken.

Display chart 214 also preferably includes performance details column 226, which displays one statistic for the measurements made during the corresponding time period (shown in hour column 218). Preferably, the statistic displayed is the average value of the metric listed at the top of the listing column during the corresponding time period. In display chart 214, for example, the left most sub-column of performance details column 226 displays the average value of the end-to-end time during the corresponding date and time. Thus, on Jun. 10, 2001, the average of the 60 measurements taken during 1900 hours of end-to-end time of the measured web site was 4.68 seconds.

Preferably, performance details column 226 is divided into as many additional columns as metrics for which measurements were taken during the relevant time period. For example, as shown in FIG. 4, which is second view of display chart 214 showing the entire performance details column 226, sub-columns for the following measurements are included in performance details column 226: end-to-end time, throughput, DNS lookup time, connect time, request time, response time, teardown time, and download time. It is also considered to include fewer or additional (if DCA 20 took measurements of additional metrics with respect to the particular object being measured) types of metrics in performance details column 226.

As discussed above, a system and method in accordance with the present invention can preferably use history of performance data statistics to alert a user about network performance that is outside acceptable tolerance or control limits. FIG. 5 is a screen display showing a portion of display chart 214 of screen display 210. In exemplary display chart 214, processing software 50 highlights a measurement statistic in a first color, as discussed above, if the measurement statistic is more that 1.5 standard deviations, but less than 2 standard deviations, away from a collective average and highlights a measurement statistic in a second color if the measurement statistic is greater than 2 standard deviations away from a collective average. As shown in FIG. 3, (in the first row of display chart 214 under in the "Avg" column and "Std Dev" column) the collective average for end-to-end time is 4.99 seconds and the collective standard deviation is 4.07. However, for hour 1000 on Jun. 11, 2001, the average end-to-end time was 13.58 seconds. This is more than 2 collective standard deviations (4.07) away from the collective average end-to-end time (4.99 seconds). Accordingly, the average end-to-end time at hour 1000 has been highlighted.

Further, the throughput for hour 1000 on Jun. 11, 2001 (26.90 KB/Sec) has been highlighted in a different color. Accordingly, while the user is not informed on display chart 214 of what the collective average or standard deviation for throughput is, the user is alerted that the throughput for hour 1000 is greater than 1 standard deviation but less that 2 standard deviations away from the collective average.

As shown in FIGS. 3–5 and discussed above, statistics screen display 210 preferably displays hourly averages of a wide range of metrics related to a network object in a relatively compact tabular format and highlights measurements which reflect that a network service may be out of control. As such, a system and method in accordance with the present invention consolidates and presents a relatively large amount of detailed network performance data. This advantageously allows a user viewing statistics screen display 210 to quickly complete a relatively thorough assessment the performance of a selected network object and determine whether any corrective actions are necessary with respect to the network object. This can advantageously save time when troubleshooting performance of a network service.

As noted above, it is also within the ambit of the present invention to display results of performance measurements and statistical calculations and comparisons in any other format such as in a graphical format.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many other variations are also to be considered within the scope of the present invention. For instance, a system and method in accordance with the present invention can measure, analyze and report network performance metrics other than those enumerated in the Background section including network performance statistics that are not associated with a URL or streaming media object. For example, a system and method in accordance with the present invention could measure, analyze and report network performance metrics associated with network hardware devices, such as server, or portions of a network.

What is claimed is:

1. A system for analyzing the performance of a network comprising:
   at least one data collection agent (DCA) located on a network and which collects performance data including at least a first set of measurements of a single network parameter and at least a second set of measurements including at least a single measurement of the single network parameter, each measurement of the at least a first set of measurements taken at a different time;
   a processing module interconnected with the at least one DCA and which calculates at least (a) a first variance statistic and (b) a second variance statistic, the first variance statistic being a variance statistic of the at least a first set of measurements and the second variance statistic being a variance statistic of the at least a second set of measurements; and
   a comparison module interconnected with the processing module and which compares the first variance statistic with at least the second variance statistic to determine if a predetermined relationship exists between the first variance statistic and the second variance statistic, wherein
   the processing module is further programmed to alert a user about a potential network performance problem based, at least in part, on whether the predetermined relationship is determined to exist between the first and second variance statistics.

2. The system of claim 1 wherein each measurement of the at least a first set of measurements is taken on a periodic basis over a first period of time and each of the at least a second set of measurements is taken over a second period of time.

3. The system of claim 2 wherein the second period of time is included within the first period of time.

4. The system of claim 2 further including a data storage module interconnected to the at least one DCA and the processing module for storing at least the at least a first set of measurements and the at least a second set of measurements and wherein the second period of time is not included with the first period of time.

5. The system of claim 2 wherein: the processing module also calculates the standard deviation of the at least a first set of measurements; and the comparison module determines if the value of the second variance statistic is within a predetermined multiple of the standard deviation of the value of the first variance statistic.

6. The system of claim 5 wherein the comparison module determines if the value of the second variance statistic is more than one standard deviation from the value of the first variance statistic.

7. The system of claim 6 wherein the comparing of the first variance statistic to the at least a second variance statistic includes determining if the value of the at least a second variance statistic is within one of either a first range and a second range, the first range defined by the values greater than one but less than or equal to two standard deviations from the value of the first variance statistic and the second range defined by the values greater than two standard deviations from the value of the first variance statistic.

8. The system of claim 5 wherein the comparison module determines if the value of the second variance statistic is within one of either a first range and a second range of the value of the first variance statistic, the first range defined by the values greater than one but less than or equal to two standard deviations from the value of the first variance statistic and the second range defined by the values greater than two standard deviations from the value of the first variance statistic.

9. The system of claim 5 wherein the comparing of the first variance statistic to the at least a second variance statistic includes determining if the at least a second variance statistic is more than one standard deviation from the first variance statistic.

10. The system of claim 1 including a user display for displaying at least the first variance statistic and the second variance statistic.

11. A system as in claim 1 further comprising a mechanism constructed and adapted to notify the user by one or more of the following: (a) sending an e-mail to the user; (b) sending a fax to the user; and (c) initiating a phone call to the user.

12. A system as in claim 1 wherein the user is alerted by a message to at least one of a PDA and a cellular telephone.

13. A system as in claim 1 wherein the network parameter is selected from the group consisting of: end-to-end time; throughput, DNS lookup time; connect time; request time; response time; teardown time; download time; quantity of data received; packet loss; percent packet loss; packets received; packets late; packets resend requested; packets recovered; packets resent; packets received normally; current bandwidth; and clip bandwidth.

14. A system as in claim 1 wherein the first and second variance statistics are selected from the group consisting of: mean value, median value, average value, standard deviation, minimum value and maximum value.

15. A method of analyzing the performance of a network including:
   collecting performance data including a first set of measurements of a single network parameter, each measurement of the first set of measurements taken at a different time;
   collecting at least a second set of measurements including at least a single measurement of the single network parameter;
   calculating a first variance statistic associated with the first set of measurements;
   calculating at least a second variance statistic associated with the at least a second set of measurements;
   comparing the first variance statistic with at least the second variance statistic to determine if a predetermined relationship exists therebetween; and
   alerting a user about potential network performance problems based, at least in part, on whether the predetermined relationship is determined to exist between the first and second variance statistics.

16. The method of claim 15 wherein:
   the collecting of the first set of measurements includes taking each measurement of the first set of measurements on a periodic basis over a first period of time; and
   the collecting of the second set of measurements includes taking each measurement of the at least a second set of measurements over a second period of time.

17. The method of claim 15 wherein a second period of time is included within a first period of time.

18. The method of claim 15 further including storing at least the first set of measurements and the at least a second set of measurements in a data storage facility.

19. The method of claim 18 wherein a second period of time is not included within a first period of time.

20. The method of claim 15 wherein:
   the calculating of the first variance statistic includes calculating an average value equal to the average value of the at least a first set of measurements; and
   the calculating of the second variance statistic includes calculating an average value equal to the average value of the at least a second set of measurements.

21. The method of claim 15 further including displaying at least the first variance statistic, the at least a second variance statistic and the results of the comparison therebetween on a user display.

22. A method as in claim 15 wherein the alerting of the user comprises:
   notifying the user by one or more of the following: (a) sending an e-mail to the user; (b) sending a fax to the user; and (c) initiating a phone call to the user.

23. The method of claim 22 wherein the first variance statistic includes an average value.

24. A method as in claim 15 wherein the user is alerted by a message to at least one of a PDA and a cellular telephone.

25. The method of claim 15 further including calculating the standard deviation of the first set of measurements and wherein the comparing of the first variance statistic to the at least a second variance statistic includes determining if the value of the at least a second variance statistic is within a predetermined multiple of the value of the standard deviation of the value of the first variance statistic.

26. A method of analyzing the performance of a network including:
   collecting performance data including a first set of measurements of a single network parameter, each of the first set of measurements taken at a different time;
   collecting at least a second set of measurements including at least a single measurement of the single network parameter;
   calculating a first variance statistic associated with the first set of measurements;
   calculating at least a second variance statistic associated with the at least a second set of measurements;
   determining whether a potential problem exists with the network's performance based, at least in part, on a comparison of the first variance statistic and the at least a second variance statistic; and
   generating an alarm when it is determined that a problem exists with the network's performance.

27. A system for analyzing the performance of a network comprising:
   at least one data collection agent (DCA) located on a network and which collects performance data including a first set of measurements of a single network parameter and at least a second set of measurements including at least a single measurement of the single network parameter, each measurement of the first set of measurements taken at a different time;
   a processing module interconnected with the DCA and which calculates at least a first variance statistic and a second variance statistic, the at least a first variance statistic being a variance statistic of the first set of measurements and the second variance statistic being a variance statistic of the at least a second set of measurements; wherein
   the processing module is further programmed (A) to determine whether a potential problem exists with the network's performance based, at least in part, on a comparison of the at least a first variance statistic and the at least a second variance statistic; and (B) to generate an alarm when it is determined that a problem exists with the network's performance.

28. A system for analyzing the performance of a network comprising:
   (A) at least one data collection agent (DCA) located on a network and which is constructed and adapted to collect performance data including a first set of measurements of a single network parameter and a second set of measurements including a single measurement of the single network parameter, each measurement of the first set of measurements taken at a different time, wherein the network parameter is selected from the group consisting of: end-to-end time; throughput, DNS lookup time; connect time; request time; response time; teardown time; download time; quantity of data received; packet loss; percent packet loss; packets received; packets late; packets resend requested; packets recovered; packets resent; packets received normally; current bandwidth; and clip bandwidth, wherein each measurement of the first set of measurements is taken on a periodic basis over a first period of time and each of the second set of measurements is taken over a second period of time distinct from the first period of time;

(B) a processing module interconnected with the at least one DCA and which calculates (a) a first variance statistic and (b) a second variance statistic, the first variance statistic being a variance statistic of the first set of measurements and the second variance statistic being a variance statistic of the a second set of measurements; and (C) a comparison module interconnected with the processing module and which is constructed and adapted to compare the first variance statistic with the second variance statistic to determine if a predetermined relationship exists between the first variance statistic and the second variance statistic, wherein the processing module is further programmed to alert a user about a potential network performance problem based, at least in part, on whether the predetermined relationship is determined to exist between the first and second variance statistics.

29. A method of analyzing the performance of a network including:

collecting performance data including a first set of measurements of a single network parameter, each measurement of the first set of measurements taken at a different time;

collecting a second set of measurements including a single measurement of the single network parameter;

calculating a first variance statistic associated with the first set of measurements;

calculating a second variance statistic associated with the second set of measurements;

comparing the first variance statistic with at least the second variance statistic to determine if a predetermined relationship exists therebetween; and alerting a user about potential network performance problems based, at least in part, on whether the predetermined relationship is determined to exist between the first and second variance statistics, wherein the user is alerted by one or more of: (a) an e-mail message; (b) a facsimile; (c) a phone call; and (d) message to a PDA; and (e) a message to a cellular telephone, wherein the collecting of the first set of measurements includes taking each measurement of the first set of measurements on a periodic basis over a first period of time; and the collecting of the second set of measurements includes taking each measurement of the second set of measurements over a second period of time.

* * * * *